Nov. 21, 1967   W. J. CAPUTI, JR   3,354,456
PULSE-TYPE OBJECT DETECTION APPARATUS
Filed Oct. 30, 1964                                          5 Sheets-Sheet 1

INVENTOR
William J. Caputi, Jr.
BY
ATTORNEY

Nov. 21, 1967  W. J. CAPUTI, JR  3,354,456
PULSE-TYPE OBJECT DETECTION APPARATUS
Filed Oct. 30, 1964  5 Sheets-Sheet 5

INVENTOR
William J. Caputi, Jr.
BY
ATTORNEY

United States Patent Office 3,354,456
Patented Nov. 21, 1967

3,354,456
PULSE-TYPE OBJECT DETECTION APPARATUS
William J. Caputi, Jr., East Northport, N.Y., assignor to Cutler-Hammer, Inc., Milwaukee, Wis., a corporation of Delaware
Filed Oct. 30, 1964, Ser. No. 408,717
11 Claims. (Cl. 343—17.2)

This invention relates to pulse-type apparatus for the detection of objects. It is particularly directed to pulse-type radars employing radio-frequency transmissions, but may be applied to apparatus employing other types of transmissions.

In conventional pulse-type radars wherein short R-F pulses are transmitted, reflected from an object, received and displayed, target or range resolution is limited by the pulse width employed. The shorter the pulses, the closer the targets can be while still being separately detectable. With 1 microsecond pulses, a resolution of about 500 feet can be obtained. With 0.1 microsecond pulses the resolution is about 50 feet; with 0.01 microsecond pulses about 5 feet, etc.

The circuits through which the pulses pass must have adequate bandwidth to preserve the pulse shape, and the shorter the pulses the greater the bandwidth required. While the exact bandwidth which should be used depends somewhat on pulse shape and on the fidelity required, one relationship often employed is that the bandwidth should be approximately the reciprocal of the pulse width. Thus the bandwidth would be 1 mc. (megacycle per second) for 1 microsecond pulses; 10 mc. for 0.1 microsecond pulses; 100 mc. for 0.01 microsecond pulses, etc. It is apparent that a high resolution radar requires very wide-band circuits.

In general, in order to detect small objects, or large objects at great distances, it is necessary to transmit large energy pulses. The shorter the pulses, the higher the peak power required to yield the same pulse energy. There are practical limits to the peak power that can be generated. To increase the pulse energy for a given peak power, without reducing resolution, an expansion dispersive network may be used in the transmitter to spread out the component frequencies of the pulses in time, and a compression dispersive network used in the receiver to compress the dispersed received echoes into short pulses. The bandwidth of the expansion and compression networks also depends on the pulse width, and very wide bands are required for short pulses. Thus the networks become very complicated and expensive. Further, for a given peak power, R-F bandwidth, and ratio of expansion or compression in the dispersive networks, a compromise is required between range and range resolution. If greater range is required the resolution must be sacrificed, and vice versa.

The present invention provides a pulse-type detection system employing expansion and compression dispersive networks in which one or both of the networks can be narrower in bandwidth, while allowing equivalent range and resolution performance, hence reducing the cost and complexity of the system. In the preferred arrangement, it is possible to improve the range and resolution performance while at the same time reducing the bandwidth required for both the expansion and compression dispersive networks.

In application Ser. No. 208,070 filed July 6, 1962, now Patent No. 3,283,080, by W. J. Caputi, Jr., for "Signal Translation Apparatus," systems are described for manipulating signals with respect to time and bandwidth. Among the manipulations described is the time expansion of signals with accompanying reduction in bandwidth. Briefly, signals are applied to an expansion dispersive means, a frequency sweep is mixed with the dispersed signals, and the sum or difference mixer output is applied to a compression dispersive means. With appropriate choice of the slope of the frequency sweep and the mixer output, output signals which are time-expanded replicas of the input signals can be obtained. Such a system can be used in radar receivers to advantage, in order to reduce the bandwidth required in certain portions of the receiver, such as I-F amplifier, video circuits, etc., as well as to facilitate telemetering, etc.

The present invention is directed to further improvments in radar or other pulse-type detection apparatus which yield marked advantages over known systems.

For convenience, the invention will be described specifically in connection with radars employing radio-frequency transmissions. The application to apparatus employing other types of transmissions will be understood by those skilled in the art.

In accordance with the invention, dispersed pulses are transmitted by the radar and reflected from objects to be detected. The received dispersed echoes are mixed with a locally-generated frequency sweep to produce a sum or difference signal in which the dispersion slope is substantially reduced, and the resultant signal is applied to a compression dispersive network whose characteristic matches the reduced dispersion slope. With proper selection of parameters, the range and range resolution of known dispersive-type radars can be obtained, while allowing the use of a narrower band compression network.

In accordance with a preferred embodiment of the invention, both the expansion dispersive network in the transmitter and the compression dispersive network in the receiver are narrow band, and the locally-generated frequency sweep is utilized in the transmitter to increase the dispersion of the pulses as transmitted, and in the receiver to reduce the dispersion of the received echoes. This not only permits both dispersive networks to be narrow band, as well as the video circuits, but also greatly facilitates improving the range and/or range resolution performance. In addition, it greatly facilitates maintaining a proper relationship between the dispersion of the transmitted pulses and received echoes and the frequency sweep in the receiver. Further, it is possible to use the same dispersive network for expansion in the transmitter and compression in the receiver.

These and other features and advantages of the invention will in part be pointed out in the description given hereinafter, and in part be understood by those skilled in the art.

Figure 1:
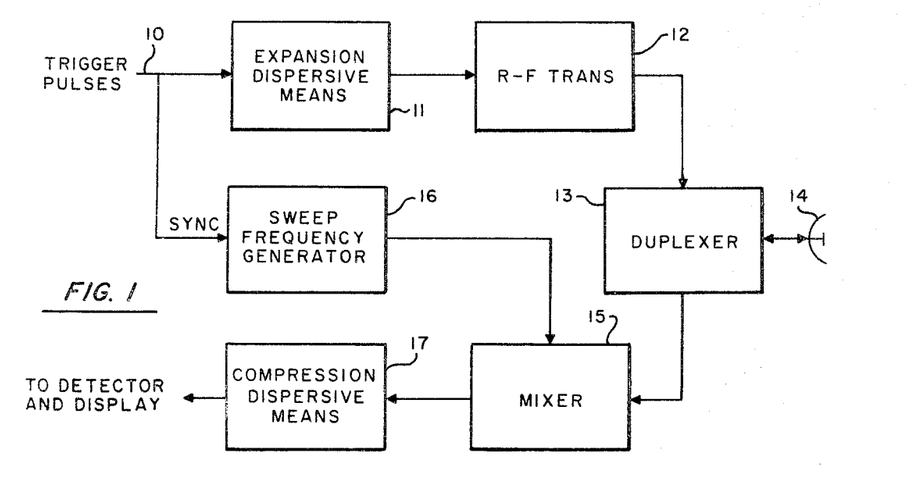
FIG. 1 is a simplified block diagram illustrating one embodiment of the invention.

Referring now to FIG. 1, a portion of a radar is shown in which trigger pulses in line 10 are supplied to expansion dispersive means 11 to expand the frequency components thereof. The dispersed pulses are fed to R-F transmitter 12 and thence through duplexer 13 to antenna 14 for transmission. The expansion dispersive means may be of any desired type, and suitable arrangements are known in the art. While the pulses could be dispersed at video, I-F (intermediate-frequency) or R-F (radio-frequency) levels, commonly it is more convenient to disperse at an I-F level, and frequency conversion can be introduced at the desired point or points in the transmitter chain.

Echoes from targets are received by antenna 14 and supplied through duplexer 13 to mixer 15. The duplexer may be of conventional design to protect the receiver circuits during the R-F transmissions, and isolate the transmitter from the receiver during reception of echoes.

Mixer 15 is also supplied with frequency sweeps from generator 16. As will be explained later, the time occurrence of the frequency sweeps participates in determining the distance to the target range section within which targets can be detected and displayed. Accordingly, the generator 16 may be synchronized with the pulse transmissions in any desired manner. As hereshown, the trigger pulses in line 10 are used for the purpose. Advantageously the synchronization is adjustable so that different target range sections may be selected. The generation and synchronization of frequency sweeps are well-known in the art and need not be described in detail.

With proper selection of the slope of the frequency sweeps and the sum or difference output of mixer 15, the dispersion slope of the received echoes may be reduced, as will be explained below in connection with FIG. 2. The output of the mixer is supplied to compression dispersive means 17 to obtain echo pulses, and the pulses are then supplied to suitable detector and display means as indicated. Usually radar receivers are of the superheterodyne type, and suitable provision may be made to convert the received R-F echoes to I-F and video. As in the case of the transmitter dispersion means, the receiver dispersive means 17 can be designed to operate at R-F, I-F or video levels, but operation at the I-F level is usually more convenient. To this end, frequency conversion can be introduced at the desired point or points in the receiver chain.

Figure 2:
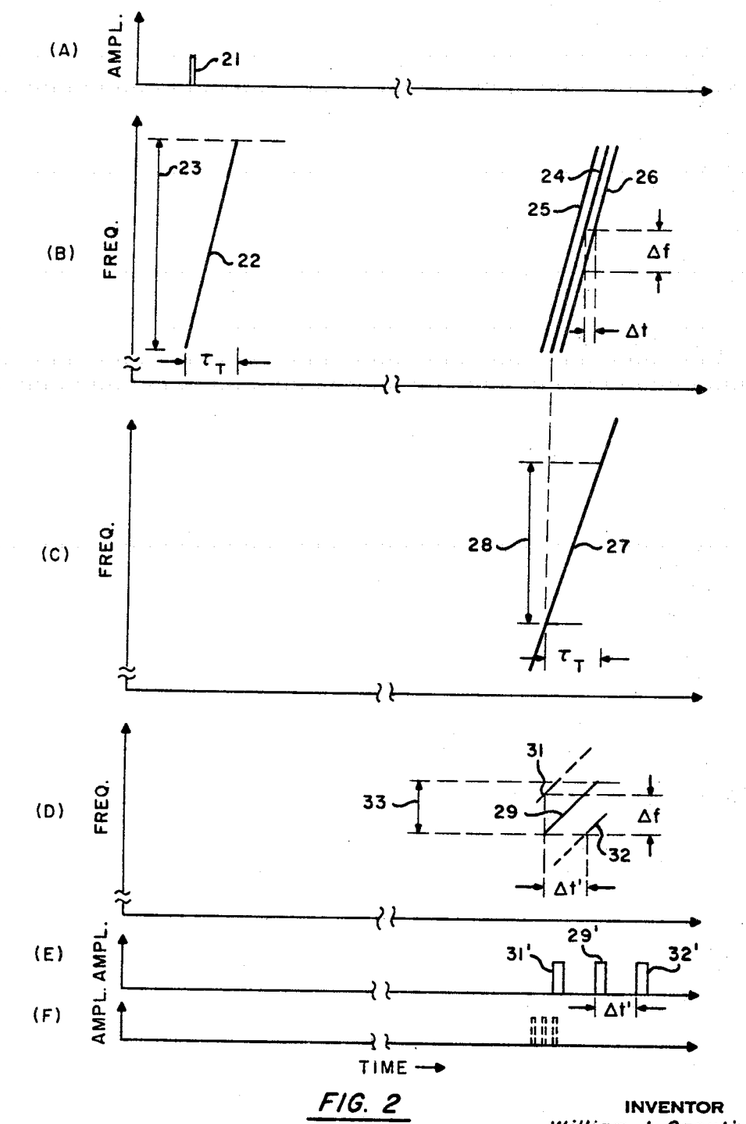
FIG. 2 is a graph explanatory of the operation of FIG. 1.

Referring to FIG. 2, graphs are shown which explain the operation of the radar of FIG. 1. A trigger pulse in line 10 is shown at 21 in FIG. 2(A) The length (time duration) of the pulse may be selected in view of the desired range resolution. FIG. 2(B) shows at 22 the dispersed pulse produced by expansion dispersive means 11. The frequency range 23 will depend on the length of the pulse and the bandwidth of the dispersive means, and it is here assumed that the bandwidth is equal to the reciprocal of the pulse length. The length of the dispersed pulse 22 is denoted $\tau_T$ and will be determined by the expansion ratio of the dispersive means 11. An expansion ratio of 20:1 has been chosen for convenience of illustration, although commonly the ratio would be much larger. Thus in FIG. 2 $\tau_T$ is 20 times the duration of pulse 21.

Received echoes are shown at 24, 25, and 26 of FIG. 2(b). These are dispersed pulses similar to 22, but occur at a considerably later time as indicated by the break in the time axis. They are supplied through duplexer 13 to mixer 15. A sweep from sweep frequency generator 16 is shown at 27 in FIG. 2(c). During the period $\tau_T$, the sweep traverses the frequency range shown at 28. The slope of sweep 27 is somewhat less than the dispersion slope of the transmitted dispersed pulse, that is, somewhat less than the slope of line 22. This yields time expansion as explained in the above-identified application. Accordingly, the frequency range 28 is less than that shown at 23, for the same time interval $\tau_T$. The closer the slope of sweep 27 is to the dispersion slope 22, the greater the expansion. For convenience of illustration, an expansion ratio of 4:1 has been selected, although commonly it would be much greater. For this expansion ratio, frequency range 28 is three-quarters of range 23. The overall length of sweep 27 is greater than that of 22, and consequently that of a received echo, so as to cover a range of echoes on either side of the center echo 24.

With the dispersed echo pulses and sweep as shown, the difference output of mixer 15 is employed. This difference output is shown at 29 in FIG. 2(D) for echo 24, and is obtained by subtracting the frequencies of sweep 27 from those of the echo. Similarly, the difference output of the mixer corresponding to echo 25 is shown at 31, and that corresponding to echo 26 is shown at 32. It will be noted that the frequency range of the resultant dispersed pulses 29, 31 and 32 is less than that of the corresponding echoes, the ratio being 1:4 in this figure. These resultant dispersed pulses are supplied to the compression dispersive means 17, which is here assumed to have a bandwidth 33 just sufficient to accommodate the range of frequencies of pulse 29 corresponding to the center echo 24. The output non-dispersed pulse of the compression dispersive means for an input dispersed pulse 29 is shown at 29′ in FIG. 2(E). In a practical dispersive network there may be an overall time delay between the end of dispersed pulse 29 and the beginning of pulse 29′, but this is disregarded for convenience of illustration and explanation. The corresponding output non-dispersed pulses of the compression dispersive means for input dispersed pulses 31, 32 are shown at 31′, 32′.

It will be noted that the width of output pulses 29′, 31′ and 32′ is greater than the initial pulse 21, and that the spacing between the output pulses is greater than the spacing shown for the corresponding dispersed echoes 24, 25 and 26. This is because of the time expansion obtained through the employment of sweep 27. In FIG. 2(B) $\Delta f$ represents the difference in frequency between echoes 24 and 26 at a given instant in time. The quantity $\Delta t$ represents the time difference between like frequencies in the two echoes. In FIG. 2(D), the same quantity $\Delta f$ shows the difference in frequencies of the dispersed pulses 29 and 32 at a given instant in time, as applied to the compression dispersive means. The quantity $\Delta t'$ shows the time difference for like frequencies. As is apparent, $\Delta t'$ is greater than $\Delta t$, the ratio being 4:1 as here shown.

Since the delay in the compression dispersive means 17 is the same for like frequencies, the frequencies in dispersed pulse 32 will issue from the compression network $\Delta t'$ after the corresponding frequencies of 29. Thus, pulse 32′ is delayed with respect to pulse 29′ by $\Delta t'$, as indicated. Similarly, pulse 31′ will occur before pulse 29′ by $\Delta t'$. Also, since the bandwidth 33 is one-fourth that shown at 23, the length of pulses 29, etc. will be four times that of the initial pulse 21. Therefore, linear expansion of initial pulse length and echo pulse separation (with respect to the initial echo separation) is obtained. By way of contrast, if an ordinary pulse radar without dispersion and compression were to transmit pulse 21, the echoes from the three targets would be as shown in FIG. 2(F). Here the echo pulses are shorter and their spacing closer than those shown in FIG. 2(E). The ratio of pulse width to pulse spacing is the same. Accordingly, the output pulses of compression dispersive means 17 give the same range resolution, but narrower band circuits may be employed thereafter for amplification, detection, and display.

Referring back to FIG. 2(D), it will be noted that the dispersed pulses 31 and 32 lie partially within and partially outside the bandwidth 33. Accordingly, pulses 31′ and 32′ will be somewhat lengthened and somewhat less in amplitude than that shown. However, the closer the targets are to that corresponding to 29′, the greater the fidelity of reproduction. If desired, bandwidth 33 could be increased. The factors entering into the determination of the target range section within which echoes may be detected will be discussed hereinafter in connection with FIG. 5.

Before proceeding further, certain aspects involved in the choice of the dispersive means may be mentioned. A dispersive device functions to delay high frequencies more than low frequencies, or vice versa. If a short pulse is applied to such a device, the frequencies of the pulse will be spread out in time, the frequency-time slope of the dispersed pulse being positive or negative depending on the direction of slope of the characteristic of the dispersive device. If a dispersed pulse of given frequency-time slope is applied to a dispersive device having a slope equal in magnitude but opposite in direction, the frequencies in the dispersed pulse will be compressed to form a non-dispersed pulse. Some dispersive devices can pass signals in either direction, with opposite slopes for opposite directions, and the direction can be selected to produce the desired result. The frequency level of a dispersed pulse can be changed by applying it to a heterodyne mixer along with a fixed local oscillator frequency. If the fixed frequency is below the frequencies of the dispersed pulse, both the sum and difference frequencies will have the same dispersion slope. If the fixed frequency is above, the sum output will have the same dispersion slope but the difference output will have the reverse slope. These expedients may be used as desired to facilitate design and production. They are explained in more detail in the above-identified application to which reference may be made if desired.

Figure 3:
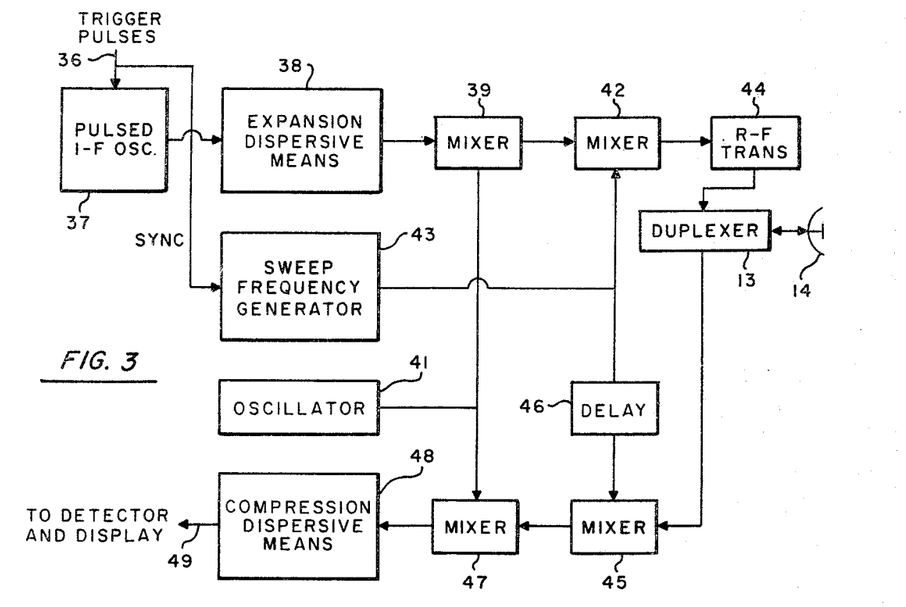
FIG. 3 is a block diagram illustrating a presently preferred embodiment of the invention.

FIG. 3 shows a preferred embodiment of the invention which has significant advantages over the arrangement described in connection with FIG. 1 and FIG. 2. FIG. 3 also shows additional detail.

Referring to FIG. 3, trigger pulses in line 36 are applied to a pulsed I-F oscillator 37 since it is desired to disperse the pulses at the I-F level. The I-F pulses are dispersed in expansion dispersive means 38. As will be explained hereinafter, the bandwidth required for the dispersive means 38 in this embodiment is much less than that described in connection with FIG. 2, for comparable range resolution. The dispersed I-F pulses are supplied to mixer 39, along with a fixed frequency from oscillator 41 in order to raise them to the R-F level. In this embodiment, instead of transmitting the pulses as dispersed by the dispersive means, the dispersed R-F pulses are supplied to a second mixer 42 along with a frequency sweep from generator 43. By using the sum output of mixer 42, the initial dispersion slope of the pulses produced in 38 is greatly increased by the frequency sweep from 43. The resultant dispersed pulses are supplied to R-F transmitter 44, duplexer 13 and antenna 14.

The received dispersed echo pulses are supplied to mixer 45 along with the frequency sweeps from generator 43, suitably delayed in 46. In mixer 45, the frequency sweeps are employed to reduce the dispersion slope of the echoes, as in FIG. 1. The resultant dispersed pulses are supplied to mixer 47, along with the fixed frequency from oscillator 41, so as to convert the dispersed pulses to the I-F level. The I-F pulses are then supplied to the compression dispersive means 48 and thence to suitable detector and display equipment as indicated.

Figure 4:
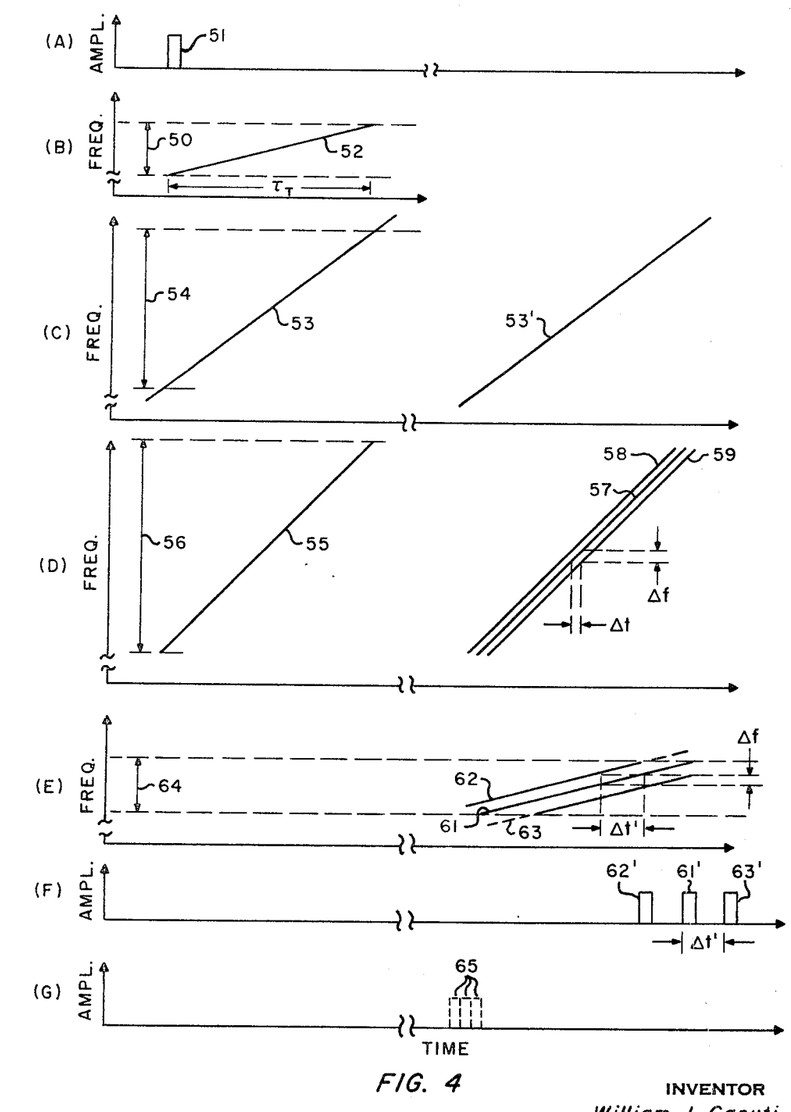
FIG. 4 is a graph explanatory of the operation of FIG. 3.

The operation of the arrangement in FIG. 3 will be described in connection with FIG. 4. The relationships specifically selected for FIG. 4 are designed to facilitate comparison with FIG. 2, the basis being equal range resolution. Thus, the output pulses shown in FIG. 4(F) have the same width and spacing as those shown in FIG. 2(E). In the embodiment of FIG. 3, the input trigger pulses may be the same length as those to be displayed. Accordingly trigger pulse 51 in FIG. 4(A) is longer than trigger pulse 21 in FIG. 2(A), a ratio of 4:1 being selected for convenience. Pulse 51 is dispersed in 38 to form the dispersed pulse shown at 52 in FIG. 4(B). The bandwidth of 38 is shown at 50. Since pulse 51 is wider than 21, the bandwidth of dispersive means 38 can be less than that of 11 in FIG. 1, one-fourth as wide in this particular case. With equal expansion ratios for the dispersive means 11 and 38, the delay dispersion $\tau_T$ is four times as long.

The frequency sweep from generator 43 is shown at 53 in FIG. 4(C). The slope of 53, and hence the frequency bandwidth as that shown at 22 in FIG. 2. The to give the desired resultant bandwidth. To enable convenient comparison with FIG. 2, the slope of 53 is selected so that, when the dispersed pulse 52 is added thereto, the resultant will be a dispersed pulse having the same frequency bandwidth as that shown at 22 in FIG. 2. The resultant is shown at 55 in FIG. 4(d). The frequency range 56 is the same as 23 in FIG. 2. However, due to the longer delay dispersion, the frequency dispersion of 55 takes place over a longer time interval, four times as long in this particular case.

Dispersed echoes from three targets are shown at 57, 58 and 59. It is assumed that the targets have the same range spacing as in FIG. 2. These are supplied to mixer 45 as already described. The delayed sweep 53′ is also supplied to mixer 45, the delay being selected to correspond to the desired target range section discussed hereinafter. The difference output of mixer 45 is employed, as in the case of FIG. 2, yielding corresponding dispersed pulses 61, 62 and 63. These are supplied to mixer 47 where they are converted to the I-F level, and then supplied to the compression dispersive means 48 to form corresponding output pulses 61′, 62′ and 63′ in FIG. 4(F).

With the relationships selected, the frequency range of dispersed pulse 61 is the same as that of 29 in FIG. 2, and the bandwidth 64 of the compression dispersive means 48 may be the same as that shown at 33 in FIG. 2. However, the delay dispersion is considerably greater, corresponding to the increased $\tau_T$. In effect, this increases the range within which targets may be picked up with good fidelity since, as will be observed, more of dispersed pulses 62 and 63 lie within the bandwidth of the compression dispersive means than is the case of dispersed pulses 31 and 32 in FIG. 2. FIG. 4(G) shows the type of echoes which would be obtained from the three targets selected, with a conventional radar transmitting pulses 51. Pulses 65 are of the same duration as those shown in FIG. 4(F) but their spacing is much closer (in the ratio of 1:4) so that they touch. Accordingly, the pulse spacing in FIG. 4(F) represents a greater range resolution than that of FIG. 4(G).

The overall length of sweep 53′ is greater than that of a received echo, say 57, so as to cover a range of echoes on either side thereof. Since sweep 53′ is a delayed replica of 53, the latter is longer than dispersed pulse 52 and starts earlier. In FIG. 3 generator 43 is triggered by a pulse which also triggers the I-F oscillator to produce an I-F pulse which is then dispersed in 38. A delay may be introduced in oscillator 37 to allow a sweep to begin before dispersion in 38, or 38 may be designed to introduce a sufficient delay for the purpose.

The arrangement of FIG. 3 has important advantages over the arrangement of FIG. 1. First, the expansion dispersive means can be of much narrower bandwidth. With the 4:1 ratio specifically chosen for illustration, the ratio of the bandwidths would be 4:1. However, if larger ratios such as 100:1 were chosen, the difference in bandwidth requirements become very significant. Wideband dispersive networks are expensive and difficult to design, so that this is an important advantage. Also, the pulses to be dispersed at the transmitter need not be as short, with corresponding decrease in bandwidth required for the circuits through which they pass.

Second, for proper operation the slope of the frequency sweep should be accurately maintained with respect to the dispersion slope of the R-F pulses and echoes. This may be difficult to maintain with sufficient precision, particularly when large expansion ratios are employed. For example, with a 100:1 expansion ratio, the slope of the frequency sweep is approximately 99% of the dispersion slope of the R-F pulses. In FIG. 3, the frequency sweep from generator 43 may be used to provide most of the dispersion at the transmitter end, and since the same sweep may be used in the receiver, no difficulty is encountered. Further, as will be described hereinafter, if desired a single dispersive means could be employed for both expansion and compression in the arrangement of FIG. 3, thereby eliminating any deterioration in performance due to changes in the dispersive networks or slight difference therebetween.

Third, for equivalent range resolution, the arrangement of FIG. 3 permits a greater delay dispersion $\tau_T$ to be employed, as is evident by comparing FIGS. 2 and 4. This increases the time interval of the dispersed pulse transmission, so that a larger average power is obtained for a given peak power, with consequent increase in range. At the receiver, the increase in $\tau_T$ increases the sampling range within which targets can be detected.

Fourth, the arrangement of FIG. 3 permits conveniently changing the range resolution of the receiver by simply changing the slope of the frequency sweeps from generator 43, without deterioration in the signal-to-noise ratio. This requires further explanation. With a long range radar of high resolution, a very large display may be required in order to display all targets within the range of the radar with full resolution. Thus, it may be necessary to display only a portion of the target range on one display device in order to obtain adequate resolution. This then requires a number of display devices to cover the entire target area and makes it more difficult to keep track of all targets. A small display device could be used to display the entire target area. This would not only reduce target resolution, but would also reduce the overall signal-to-noise ratio since the smaller display device would be, in effect, a low pass filter which cuts off some of the received pulse frequencies. With the arrangement of FIG. 3 of the present invention, the entire target area can be presented on the display device by reducing the slope of the sweeps from generator 43. Target resolution will be lost as before. However, the signal-to-noise ratio will remain substantially the same since all the transmitted frequencies in the dispersed pulses will still be received and utilized. Then, when it is desired to examine a particular portion of the target area with full resolution, the slope of the sweeps from generator 43 can be increased and the delay provided by 46 chosen so that the desired portion is expanded on the display.

Figure 5:
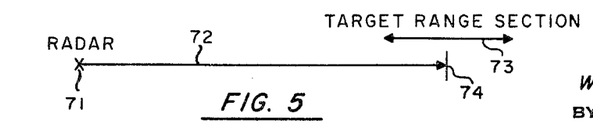
FIG. 5 is explanatory of the target range section available with the apparatus of FIGS. 1 and 3.

The length of the target range section and its distance from the transmitter will be explained more fully in connection with FIG. 5, wherein a radar at 71 transmits pulses along line 72. A target range section is shown by the double-headed arrow 73, and its center is shown at 74. The distance at which the section is located, that is, the distance to point 74, can be selected by adjusting the delay of the frequency sweeps in the receiver with respect to the transmitted dispersed pulses. In FIG. 2, the more sweeps 27 is delayed with respect to the dispersed pulse 22 (or pulse 21 from which 22 is obtained), the greater the distance to the range section. In FIG. 4, increasing the delay of sweep 53' with respect to sweep 53 gives the same result.

The length 73 of the target range section is determined largely by the length of the transmitted dispersed pulse ($\tau_T$), the expansion ratio between the spacing of received echoes and displayed pulses, and the bandwidth of the compression dispersive means. The effect of $\tau_T$ can be seen by comparing FIGS. 2 and 4. In FIG. 4 $\tau_T$ is greater than in FIG. 2, and FIG. 4(E) shows that more of the dispersed pulses corresponding to echoes on either side of the center echo lie within the bandwidth of the compression dispersive means than in FIG. 2(D). Thus a larger $\tau_T$ extends the range within which echoes are reproduced with adequate fidelity. The effect of increasing the bandwith of the compression dispersive means can also be seen from FIGS. 2(D) and 4(E). As the bandwidth is increased, more and more of the dispersed pulses lying on either side of the center pulse will lie within the bandwidth.

The effect of an increase in expansion ratio is to cause the dispersed pulses on either side of the center pulse to pass more quickly outside of the bandwidth of the compression dispersive means. Thus, if in FIG. 4 the slope of frequency sweeps 53, 53' were increased to obtain greater expansion, leaving $\tau_T$ and bandwidths 50 and 64 unchanged, the slopes of dispersed pulses 61–63 corresponding to received echoes would remain the same, but their vertical separation would increase. This would increase $\Delta t'$ and the separation of the output pulses in FIG. 4(F), giving greater expansion and target resolution. However, the increased vertical separation means that the dispersed pulses corresponding to received echoes on either side of the central echo will pass outside of bandwidth 64 more rapidly, and their fidelity of reproduction will decrease more rapidly. Consequently, for a given degree of fidelity the length of the target range section will be less.

Defining the length of the range section as corresponding to a 3 db decerase in pulse energy at the ends of the section, for sin $x/t$ pulses the length of the section is approproximately $\tau_T \times \Delta t / \Delta t$. Hence the sample length increases as $\tau_T$ is increased, and decreases as the expansion ratio is increased.

In the embodiments described above, a single delayed sweep is applied to the receiver at a desired interval after a pulse is transmitted, so that a single target range section is produced. It is possible to produce multiple sections at different distances from the transmitter for each pulse transmission. This is accomplished by using a plurality of successively recurring sweeps at the receiver for each pulse transmission. As will be observed from the above equation for the length of the target range section, as the expansion ratio increases the length of the section becomes a smaller and smaller fraction of the time $\tau_T$. Accordingly, successive sweeps will yield spaced sections which do not overlap in time. This will be explained in connection with FIG. 6, and a suitable modification of FIG. 3 will be explained in connection with FIG. 7.

Figure 6:
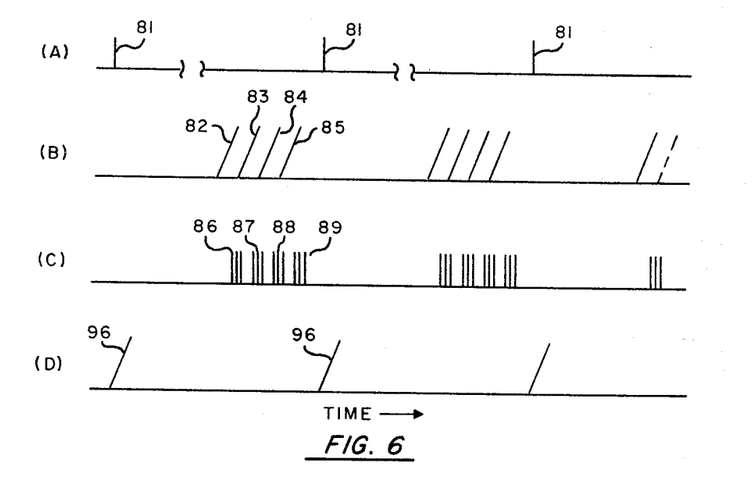
FIG. 6 is a graph explaining the manner of producing multiple target range reactions.

Referring to FIG. 6, several transmitter driving pulses 81 are shown at (A). They may correspond to pulses 21 or 51 in FIGS. 2 and 4. They will occur at large intervals on the time scale employed, so breaks in the time scale are shown between pulses.

FIG. 6(B) shows a plurality of receiver sweeps 82–85 occurring after each transmitted pulse 81. One of these sweeps, say 82, may be considered to be sweep 27 or 53' in FIGS. 2 and 4. The sweep then repeats as sweeps 83–85. Each sweep 82–85 corresponds to a particular target range section as discussed above in connection with FIG. 5. Successive sweeps correspond to range sections at greater distances from the transmitter. Targets within each range section will result in output pulses such as shown in FIGS. 2(E) and 4(F). Corresponding sets of output pulses are shown at 86–89 in FIG. 6(C) for respective receiver sweeps 82–85. The duration of the sweeps may be selected so that the individual section lengths are not reduced, and if necessary the sweeps may be separated somewhat so as to avoid any overlapping of output pulse groups. If it is desired to reduce or eliminate gaps between the target range sections, a plurality of receiver channels may be employed with suitable delay of the sweeps in each channel to cover different sections, or provision may be made to change the delays in a single channel in a periodic manner so that different sections are covered in succession.

Figure 7:
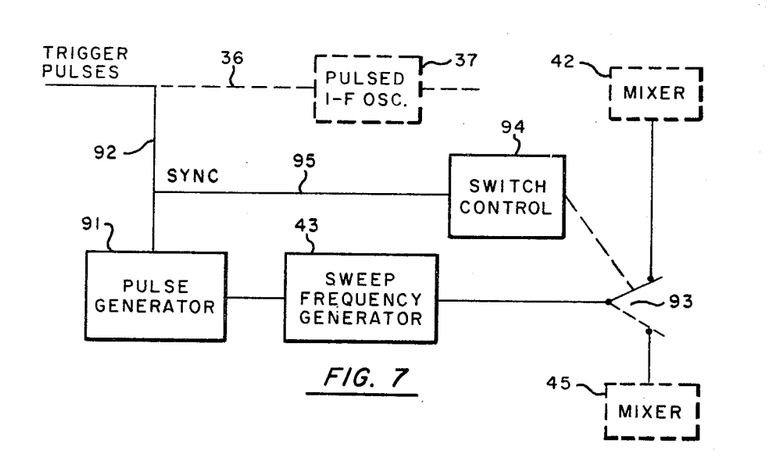
FIG. 7 illustrates a modification of FIG. 3 for producing multiple range sections.

FIG. 7 shows a modification of FIG. 3. Some portions of FIG. 3 necessary for the explanation are shown dotted and bear the same numbers. Here sweep frequency generator 43 is controlled by pulses from generator 91, it being assumed that each pulse triggers one sweep. The pulse generator is synchronized by trigger pulses applied thereto through line 92. During the transmission of a pulse, the output of generator 43 is applied to mixer 42 through switch 93 in its upper position. A switch control circuit 94 is supplied with the trigger pulses through line 95 and serves to control switch 93. Although the latter is shown as a mechanical switch, it will be understood that it will ordinarily be an electronic switch so as to secure sufficiently fast switching to pass one sweep from generator 43 to mixer 42 for each trigger pulse. Such sweeps are shown at 96 in FIG. 6(D), and correspond to sweep 53 in FIG. 4(C). Thereafter switch control circuit 94 moves switch 93 to its lower (dotted) position to supply subsequent sweeps from generator 43 to mixer 45 in the receiver channel. The pulse generator 91 may be designed to produce repetitive pulses for each application of a trigger pulse through line 92, or additional means may be employed to produce control pulses at any desired intervals after each transmitter pulse.

In some instances it may be unnecessary to employ switch 93, and the sweep generator 43 may be connected to mixers 42 and 45 at all times. For example, an expanded I-F pulse will be supplied to mixer 42 only once for each trigger pulse, along with a sweep from generator 43. Thus, the outputs of mixer 42 will be in a different frequency range for subsequent sweeps from 43. If these subsequent outputs lie outside the bandwidth of the R-F transmitter 44, it may not be necessary to prevent them from occurring. Duplexer 13 will prevent the receiver circuits from operating during the initial sweep from generator 43 since transmission is taking place, so that supplying this initial sweep to mixer 45 may do no harm.

Figure 8:
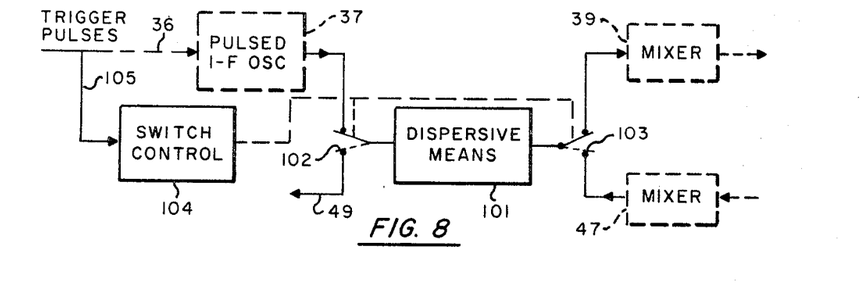
FIG. 8 illustrates a modification of FIG. 3 to employ a single dispersive means for transmitter and receiver.

Referring to FIG. 8, a modification of FIG. 3 is shown which employs a single dispersive means for expansion in the transmitter and compression in the receiver. The portions of FIG. 3 necessary for an understanding of the modification are shown dotted and given the same numbers. Here the dispersive means 101 is connected between the pulsed I-F oscillator 37 and mixer 39 during transmission, by switches 102 and 103 in the upper positions shown. During reception the dispersive means 101 is connected between mixer 47 and the output line 49 by the switches 102, 103 in their lower (dotted) positions. The switches are ganged and moved from one position to the other by a switch control circuit 104, supplied with trigger pulses through line 105.

The interval between successive pulses to be dispersed for transmission is large compared to the time interval $\tau_T$. The switch control circuit 104 is arranged to move switches 102, 103 to the upper positions shown during the occurrence of each trigger pulse in line 36, and to maintain the switches in those positions for a time $\tau_T$ or somewhat greater, whereupon the switches are moved to their lower (dotted) positions. It will be understood that although mechanical switches are illustrated, they will commonly be electronic switches sufficiently fast for the purpose. If necessary, a slight delay can be introduced in the application of the trigger pulses to the I-F oscillator 37, so as to allow the switches to reach their upper positions before the dispersive means 101 is required to function for transmission.

As in the case of FIG. 7, in some instances it may not be necessary to switch the dispersive means 101. During transmission the feeding of a pulse from I-F oscillator 37 to receiver line 49 and the application of a dispersed pulse to the output of mixer 47 may not be objectionable. During reception the application to mixer 39 of a dispersed pulse from mixer 47 corresponding to a received echo may not be objectionable if a sweep is not simultaneously applied to mixer 42 in the transmitter channel.

As illustrated, it is assumed that the dispersive means 101 is capable of passing signals in either direction, dispersing in the forward direction, and compressing in the reverse direction, expanding signals passing therethrough from left to right, and compressing signals passing therethrough in the opposite direction. If a dispersive means is employed which passes signals in only one direction, the slope of the dispersed pulses from mixer 47 can be inverted by suitable heterodyning with a fixed frequency as described hereinbefore, so as to give the required direction of slope for the dispersive means to compress. In such case, the switching would be arranged to interchange the input and output of dispersive means 101 for reception.

In FIG. 3, a delay circuit 46 is shown for introducing a delay between the time a given sweep is effective in the transmitter, and the time it is effective in the receiver. The delay time sets the distance at which targets will be picked up. That is, it determines the distance between the transmitter and the target range section as described in connection with FIG. 5. While the concept of delaying a given sweep facilitates understanding the invention, in many cases of practical importance it may not be feasible to construct a delay unit of sufficient bandwidth and overall time delay. In such case, alternative ways of obtaining a similar overall effect may be employed.

Figure 9:
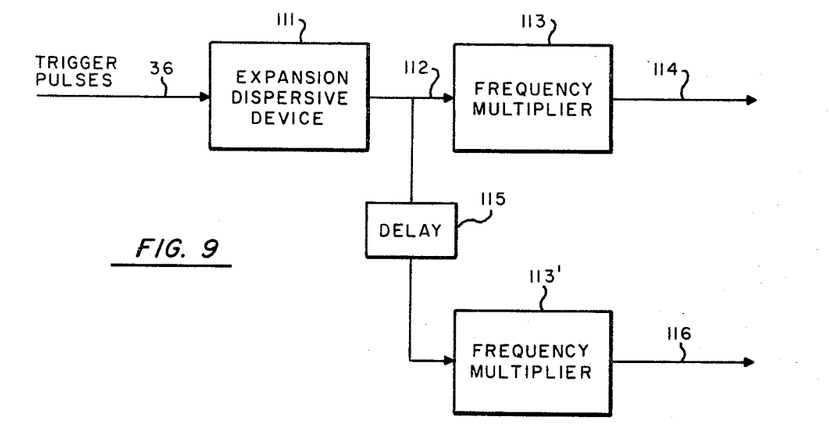
FIG. 9 illustrates a modification of FIG. 3 for producing transmitter and receiver frequency sweeps.

FIG. 9 shows one such alternative. As pointed out in application Ser. No. 208,070, supra, sweeps may be produced by applying pulses to an expansion dispersive device. Each pulse has its frequencies spread out in time so as to form a frequency sweep. In FIG. 9 trigger pulses from line 36 are applied to an expansion diversive device 111 which is relatively narrow band, so that the slope of a sweep in line 112 is small compared to that desired. Then the sweep is supplied to a frequency multiplier 113 which multiplies each component frequency in line 112 so as to give an output sweep in line 114 of the desired slope (frequency versus time). This sweep may then be fed to mixer 42 in FIG. 3 in place of the sweep from generator 43. The relatively narrow band sweep in line 112 is also fed through a delay unit 115 to a frequency multiplier 113' similar to multiplier 113. Thus, the sweep output in line 116 will be the same as in line 114, but delayed, and may be fed to mixer 45 in FIG. 3. Since delay unit 115 may have a bandwidth much less than that of delay unit 46, it will often be easier to design and build.

Figure 10:
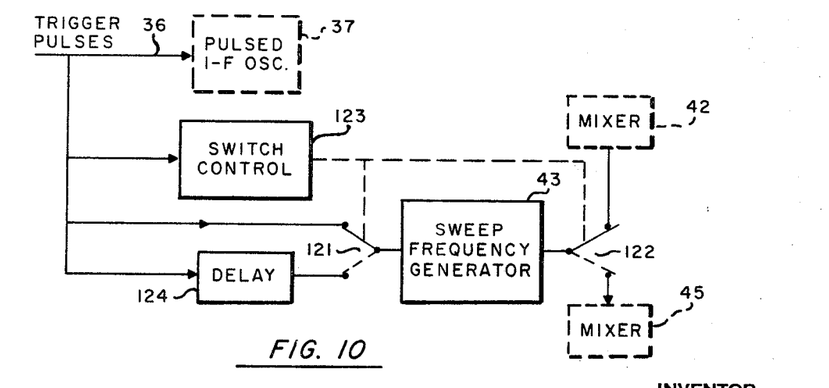
FIG. 10 illustrates another arrangement for producing a plurality of target range sections.

FIG. 10 shows another alternative. Here a sweep frequency generator 43 is employed which is like that shown in FIG. 3, and arranged so that each pulse applied thereto triggers a corresponding sweep. With switches 121 and 122 in their upper positions shown in full lines, a trigger pulse in line 36 is applied to generator 43 and a corresponding sweep supplied to mixer 42. Switch control circuit 123 is arranged to hold the switches in the positions shown during the generation of the initial sweep, and then move them to their lower (dotted) positions. The trigger pulse in line 36 is also fed through a delay unit 124 designed to delay the pulse by an amount corresponding to the desired distance to the target range section. The delayed pulse then triggers generator 43 to produce another sweep which is fed to mixer 45.

In FIGS. 1 and 3 the dispersed signals corresponding to received echoes are subtracted from the locally-generated sweeps in order to obtain signals of decreased dispersion, and in FIG. 3 the sum of the sweeps and dispersed pulses is used to obtain pulses of increased dispersion for transmission. It will be understood by those skilled in the art that it is possible to design the apparatus to use either sum or difference, and in the case of the difference either may be subtracted from the other, depending on the sweep center frequency and desired slope of the resultant signals. These and other modifications may be made by those skilled in the art as meets the requirements of a given application.

I claim:
1. In a pulse-type object detection apparatus, the combination which comprises
   (a) means for transmitting dispersed pulses of predetermined frequency-time slope,
   (b) means for receiving corresponding dispersed pulses from objects at a distance,
   (c) means for producing a frequency sweep having a frequency-time slope different from that of the received dispersed pulses,
   (d) mixer means supplied with said received dispersed pulses and said sweep for producing resultant dispersed pulses having a frequency-time slope substantially less than that of the received pulses,
   (e) and compression dispersive means supplied with said resultant dispersed pulses for producing corresponding substantially non-dispersed pulses.

2. In a pulse-type object detection apparatus, the combination which comprises
   (a) a source of pulses,
   (b) expansion dispersive means supplied with said pulses for producing respective dispersed pulses of predetermined frequency-time slope,
   (c) means for transmitting said dispersed pulses and receiving echoes thereof from objects at a distance,
   (d) sweep frequency generator means for producing frequency sweeps having a frequency-time slope different from that of said received echoes,
   (e) a mixer supplied with said echoes and said sweeps for producing resultant dispersed pulses having a frequency-time slope substantially less than that of the echoes,
   (f) and compression dispersive means supplied with said resultant dispersed pulses for producing corresponding substantially non-dispersed pulses.

3. Apparatus in accordance with claim 2 including means for synchronizing said sweep frequency generator means with pulses from said source and produce delayed frequency sweeps occurring during the reception of echoes from the objects in a selected target range section.

4. Apparatus in accordance with claim 3 including means for actuating said sweep frequency generator means to produce a plurality of frequency sweeps after each pulse from said source with different delays corresponding to different target range sections.

5. In a pulse-type object detection apparatus combination which comprises
   (a) a source of pulses,
   (b) expansion dispersive means supplied with said pulses for producing respective dispersed pulses of predetermined frequency-time slope,
   (c) sweep frequency generator means for producing frequency sweeps occurring with said dispersed pulses and frequency sweeps delayed with respect thereto,
   (d) mixer means for mixing said dispersed pulses and simultaneously occurring frequency sweeps to produce respective dispersed pulses of increased frequency-time slope,
   (e) means for transmitting said respective dispersed pulses and receiving corresponding dispersed pulses from objects at a distance,
   (f) mixer means for mixing said delayed frequency sweeps and received dispersed pulses occurring therewith to produce resultant dispersed pulses having a frequency-time slope substantially less than that of the received pulses,
   (g) and compression dispersive means supplied with said resultant dispersed pulses for producing corresponding substantially non-dispersed pulses.

6. Apparatus in accordance with claim 5 including switch means for supplying sweeps from said sweep frequency generator means to the first-mentioned mixer means during the occurrence of dispersed pulses supplied to the mixer means and for supplying said delayed sweeps to the second-mentioned mixer means for mixing with received dispersed pulses occurring therewith.

7. Apparatus in accordance with claim 5 including means for actuating said sweep frequency generator means to produce a plurality of delayed frequency sweeps after each said sweep occurring with a dispersed pulse with different delays corresponding to different target range sections.

8. In a pulse-type object detection apparatus, the combination which comprises
   (a) a source of pulses,
   (b) expansion dispersive means supplied with said pulses for producing respective dispersed pulses of predetermined frequency-time slope,
   (c) sweep frequency generator means for producing frequency sweeps occurring with said dispersed pulses and frequency sweeps delayed with respect thereto,
   (d) the frequency-time slope of said frequency sweeps being substantially greater than that of said dispersed pulses,
   (e) mixer means for mixing said dispersed pulses and simultaneously occurring frequency sweeps to produce respective dispersed pulses of increased frequency-time slope,
   (f) means for transmitting said respective dispersed pulses and receiving echoes thereof from objects at a distance,
   (g) mixer means for mixing said delayed frequency sweeps and echoes occurring therewith to produce resultant dispersed pulses having a decreased frequency-time slope substantially equal to said predetermined frequency-time slope,
   (h) and compression dispersive means supplied with said resultant dispersed pulses for producing corresponding substantially non-dispersed pulses.

9. Apparatus in accordance with claim 8 in which said expansion and compression dispersive means are a common dispersive means adapted to disperse non-dispersed pulses applied thereto and compress dispersed pulses applied thereto, including means for connecting the common dispersive means to receive and disperse pulses from said source of pulses during the occurrence thereof and for connecting the common dispersive means to receive and compress said resultant dispersed pulses corresponding to received echoes during the occurrence thereof.

10. Apparatus in accordance with claim 9 including means for actuating said sweep frequency generator means to produce a plurality of delayed frequency sweeps after each said sweep occurring with a dispersed pulse with different delays corresponding to different target range sections.

11. In a pulse-type object detection apparatus, the combination which comprises
   (a) a source of pulses,
   (b) expansion dispersive means supplied with said pulses for producing respective dispersed pulses of predetermined frequency-time slope,
   (c) a sweep frequency generator adapted to produce a frequency sweep in response to a pulse applied thereto,
   (d) means for supplying pulses from said source to said generator to produce respective frequency sweeps,
   (e) a mixer supplied with said dispersed pulses and frequency sweeps to produce respective dispersed pulses of increased frequency-time slope, (f) means for transmitting said respective dispersed pulses and receiving echoes thereof from objects at a distance, (g) means for producing pulses delayed with respect to pulses from said source and applying the delayed pulses to said generator to produce respective delayed frequency sweeps, (h) a mixer supplied with said delayed frequency sweeps and echoes occurring therewith to produce resultant dispersed pulses having a frequency-time slope substantially less than that of the echoes, (i) and compression dispersive means supplied wtih said resultant dispersed pulses for producing corresponding substantially non-dispersed pulses.

No references cited.

RODNEY D. BENNETT, *Primary Examiner.*

CHESTER L. JUSTUS, *Examiner.*

C. L. WHITHAN, *Assistant Examiner.*